(12) United States Patent
Lang et al.

(10) Patent No.: US 11,735,331 B2
(45) Date of Patent: Aug. 22, 2023

(54) INSULATION SYSTEM, INSULANT, AND INSULATION MATERIAL FOR PRODUCING THE INSULATION SYSTEM

(71) Applicant: Siemens Aktiengesellschaft, Munich (DE)

(72) Inventors: Steffen Lang, Hallerndorf (DE); Niels Müller, Nuremberg (DE); Bastian Plochmann, Neustadt an der Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/651,952

(22) PCT Filed: Sep. 18, 2018

(86) PCT No.: PCT/EP2018/075166
§ 371 (c)(1),
(2) Date: Mar. 27, 2020

(87) PCT Pub. No.: WO2019/063358
PCT Pub. Date: Apr. 4, 2019

(65) Prior Publication Data
US 2020/0312483 A1    Oct. 1, 2020

(30) Foreign Application Priority Data
Sep. 28, 2017 (EP) .................................... 17193641

(51) Int. Cl.
*H01B 3/00* (2006.01)
*H01B 1/22* (2006.01)
*H02K 3/40* (2006.01)

(52) U.S. Cl.
CPC ............... *H01B 3/004* (2013.01); *H01B 1/22* (2013.01); *H02K 3/40* (2013.01)

(58) Field of Classification Search
CPC . H01B 1/20; H01B 1/22; H01B 3/004; H02K 3/40
(Continued)

(56) References Cited

U.S. PATENT DOCUMENTS

| 6,645,886 B1 * | 11/2003 | Muhrer | H01B 3/004 427/389.9 |
| 2010/0140560 A1 * | 6/2010 | Wang | B82Y 40/00 261/78.1 |

(Continued)

FOREIGN PATENT DOCUMENTS

| CN | 105210270 A | 12/2015 | ............. G03F 7/029 |
| CN | 107004461 A | 8/2017 | ............... H01B 3/00 |

(Continued)

OTHER PUBLICATIONS

Tran and S. B. Rananavare, "Synthesis and characterization of N- and P-doped tin oxide nanowires," 2011 11th IEEE International Conference on Nanotechnology, 2011, pp. 144-149, doi: 10.1109/NANO.2011.6144603 (Year: 2011).*

(Continued)

*Primary Examiner* — Tri V Nguyen
(74) *Attorney, Agent, or Firm* — Slayden Grubert Beard PLLC

(57) ABSTRACT

Various embodiments include an insulation material for an electrical rotating machine comprising: a curable matrix material; a curing agent; and a filler embedded in the matrix material. The filler comprises electrically conductive doped metal oxide particles.

11 Claims, 4 Drawing Sheets

(58) Field of Classification Search
USPC .......................................... 252/500, 510, 511
See application file for complete search history.

(56) References Cited

U.S. PATENT DOCUMENTS

| | | | |
|---|---|---|---|
| 2014/0248479 A1 | 9/2014 | Pihale et al. | 428/216 |
| 2015/0042195 A1 | 2/2015 | Brockschmidt et al. | 310/196 |
| 2015/0357890 A1* | 12/2015 | Griem | H02K 15/105 |
| | | | 427/569 |
| 2016/0369110 A1 | 12/2016 | Huber et al. | 428/447 |
| 2016/0374237 A1 | 12/2016 | Klaussner et al. | 310/196 |
| 2018/0005722 A1 | 1/2018 | Lang et al. | |
| 2018/0145554 A1 | 5/2018 | Lang et al. | |

FOREIGN PATENT DOCUMENTS

| | | | | |
|---|---|---|---|---|
| DE | 10 2012 205 563 A1 | 10/2013 | ............. | H02K 15/10 |
| EP | 2742513 A1 | 5/2018 | ............... | C09D 1/00 |
| WO | 2012/041648 A1 | 4/2012 | ............. | B32B 27/12 |
| WO | 2014/206676 A1 | 12/2014 | ............... | C09D 5/00 |
| WO | 2015/128367 A1 | 9/2015 | ............... | H01B 3/52 |
| WO | 2016/188831 A1 | 12/2016 | ............... | H02K 3/40 |
| WO | 2017/134040 A1 | 8/2017 | ............. | H01F 27/28 |
| WO | 2019/063358 A1 | 4/2019 | ............. | H01B 1/20 |

OTHER PUBLICATIONS

International Search Report and Written Opinion, Application No. PCT/EP2018/075166, 16 pages, dated Nov. 21, 2018.
Indian Office Action, Application No. 202017012949, 5 pages, dated Nov. 10, 2020.
Chinese Office Action, Application No. 201880074552.3, 8 Pages, dated Feb. 2, 2021.
Chinese Notice of Allowance, Application No. 201880074552.3, 7 pages, dated Dec. 5, 2022.
European Office Action, Application No. 18779273.4, 6 pages, dated Jan. 17, 2023.

* cited by examiner

INSULATION SYSTEM, INSULANT, AND INSULATION MATERIAL FOR PRODUCING THE INSULATION SYSTEM

CROSS-REFERENCE TO RELATED APPLICATIONS

This application is a U.S. National Stage Application of International Application No. PCT/EP2018/075166 filed Sep. 18, 2018, which designates the United States of America, and claims priority to EP Application No. 17193641.2 filed Sep. 28, 2017, the contents of which are hereby incorporated by reference in their entirety.

TECHNICAL FIELD

The present disclosure relates to electrical machines. Various embodiments may include an insulation system for an electrical machine, more particularly a rotating electrical machine from the high-voltage or medium-voltage range, such as, for example, a generator, transformer, a bushing and/or a cable, which are subject to relatively high rated voltages at operating voltages, i.e., for example, from 10 kV or more. The insulation system comprises an insulant, which is in turn producible by curing from an insulation material.

BACKGROUND

Ever more powerful machines, such as generators, for example, are being developed, because the advancing technology is demanding ever higher power densities. A powerful generator, such as a turbogenerator, for example, has in particular a stator with a laminated stator core, and a plurality of generator slots in which the generator insulation system is located, in the form of a winding, for example.

The main insulation of this winding with respect to the laminated core is subject to high electrical loading. High voltages occur in operation, and must be brought down in the insulating volume between the conductor bar, which is under a high voltage, and the laminated core, which is at ground potential. Increases in the field occur here at the edges of the sheets in the laminated core, and in turn give rise to partial discharges. When they meet the insulation system, these partial discharges lead locally to very intense overheating. In that case the organic materials of the insulation system are broken down successively into volatile products of low molecular mass, such as into $CO_2$, for example.

An important constituent of the insulation system is the so-called outer corona shielding, OCS for short. With relatively large electrical machines, it is applied to the surface of the winding insulation. The OCS typically consists of corona shielding papers which contain carbon black and graphite and are impregnated with a resin. Since, for system-related reasons, the interface between the OCS and the main insulation, in particular, cannot be produced entirely without pores, correspondingly high electrical field intensities in the insulation system are accompanied by correspondingly high electrical partial discharge activity, which completely incinerates the outer corona shielding in operation and in the course of time and therefore leads to premature aging of the insulation system and, in the worst case, to a ground fault of the electrical machine. This corresponds to complete, irreparable failure of the machine.

An outer corona shielding refers to a conductive layer which functions as an electrically conductive point for predetermined breaking between the main insulation and the laminated core in the active part of the generator. A boundary layer with long-term stability between insulation system and laminated core is rendered realistically impossible by thermal expansion and mechanical loads caused by vibration. As the OCS, therefore, a predetermined breaking layer is incorporated, which ensures electrical contact over the surface. The sheets of the laminated core are short-circuited just enough to prevent any significant field excesses leading to partial discharge. Furthermore, the OCS does not go below a certain minimum resistance, in order to prevent circulating currents between the otherwise electrically insulated sheets.

A complete prevention of partial discharges is virtually impossible, since defects—in the form of gaps and pores—come about between OCS and laminated core in operation, for manufacturing reasons or as a result of mechanical and/or thermal loads, and partial discharges are triggered in these defects during operation. For reference, in EP 3078033, the OCS layer of the insulation system described therein contains a composite material composed of carbon particles in planar and/or globular form, with or without reinforcing fibers, in a polymeric matrix, where the filler concentration exceeds the percolation threshold and there is therefore an electrically partly conductive insulant present in the insulation system.

A disadvantage of typical systems, however, is that under the high prevailing electrical loads, which under an oxygen atmosphere, in other words, for example, not simply under inert gas but instead in air, usually act in the form of electrical partial discharges and/or incandescent loads on the insulation system, the oxygen, especially under the prevailing energetic conditions, corrodes and decomposes the carbon black or graphite—by transforming it into $CO_2$, for example—and hence the partial conductivity of the insulant is also destroyed.

SUMMARY

The teachings of the present disclosure include fillers which under the stated conditions are more resistant to oxygen degradation in operation, in other words under partial discharge, than are the known insulants for insulation systems that are filled with coated carbon particles. For example, some embodiments of the teachings herein include an insulation material for an electrical rotating machine, comprising a curable matrix material with a curing agent and a filler embedded therein, there being present in the filler at least one particle fraction of metal oxide particles which through doping are electrically conductive.

In some embodiments, the at least one particle fraction is present at a concentration which exceeds the percolation threshold.

In some embodiments, the at least one particle fraction of doped metal oxide has an aspect ratio of 10 or higher.

In some embodiments, there are a plurality of particle fractions present which are electrically conductive, are made of doped metal oxide and are embedded in the curable matrix material.

In some embodiments, there are a plurality of particle fractions present having different forms.

In some embodiments, the at least one particle fraction is present in the form of spheres, i.e., with globular particles.

In some embodiments, there are at least two particle fractions present having different dimensions.

In some embodiments, there is at least one particle fraction present which has particles with at least one nanoscale dimension.

In some embodiments, there is at least one particle fraction present which has particles with at least one microscale dimension.

In some embodiments, the conductive particles of metal oxide have n-doping.

In some embodiments, the conductive particles of metal oxide are solid.

In some embodiments, the metal oxide is selected from the group of the following metal oxides: metal oxides in binary and tertiary mixed phase, especially tin oxide, zinc oxide, zinc stannate, titanium oxide, lead oxide, silicon carbide, chromium oxide, aluminum oxide, any desired mixtures thereof, and/or further metal oxides or mixed metal oxides that are suitable for doping.

In some embodiments, the doping element is selected from the group of the following elements: antimony, fluorine, chlorine, tungsten, molybdenum, iron, phosphorus, sulfur, nickel, alone or in any desired combinations.

Some embodiments include an insulant obtainable by curing an insulation material as described above. As another example, some embodiments include an insulation system comprising a main insulation, an outer corona shielding and an overhang corona shielding, the outer corona shielding having an insulant as described above.

DETAILED DESCRIPTION OF THE DRAWINGS

Figure 1:
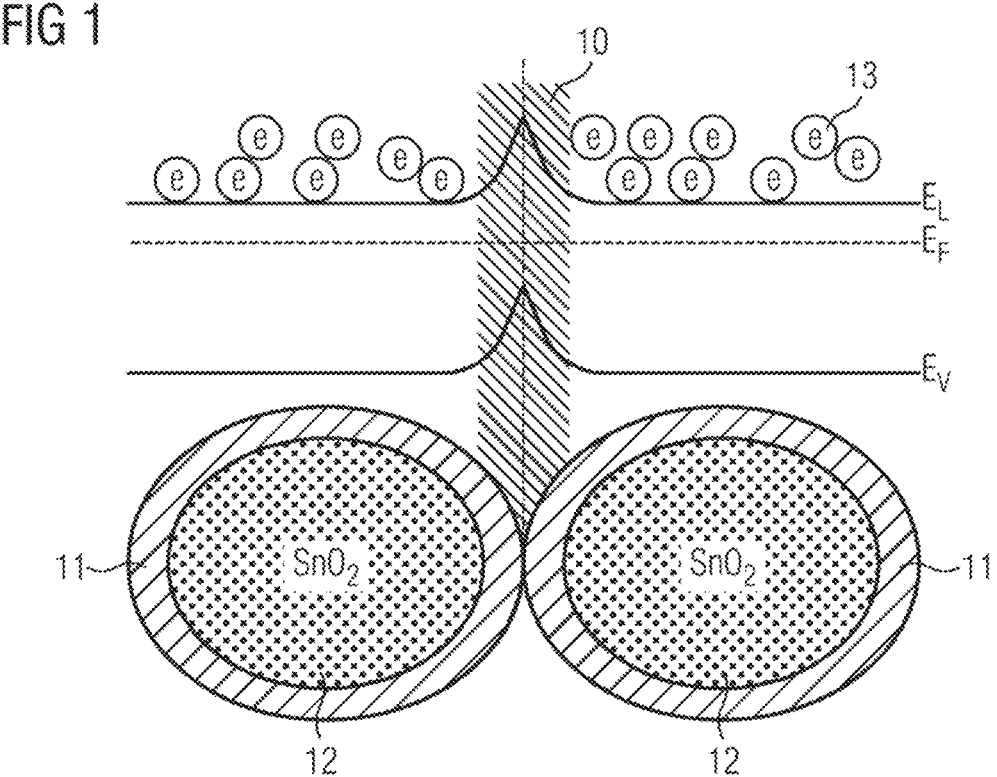
FIG. 1 is a drawing showing a schematic of tin oxide particles having high-resistance depletion boundary layers.

The teachings of the present disclosure include various insulation materials for an electrical rotating machine, comprising a curable matrix material and a curing agent with filler embedded therein, the filler having at least one particle fraction of metal oxide particles which through doping are conductive, insulants which are produced by curing the insulating material, and/or insulation systems which comprises such an insulant.

In some embodiments, the at least one filler fraction with the metal-oxidic particles which are electrically conductive through doping is present in the insulation material at a concentration which exceeds the percolation threshold.

In some embodiments, as outer corona shielding, overhang corona shielding and/or internal potential control, the insulation system contains a layer of an insulant which is producible by curing by virtue of the insulation material with the curable matrix material, the curing agent and the at least one filler fraction.

In some embodiments, there is an insulation system present which comprises an insulant that is obtainable by curing of an insulation material according to the invention and that, as outer corona shielding OCS, overhang corona shielding OvCS and/or internal potential control, has a layer having a resistance in the kiloohm to megaohm range, as the square resistance of a layer of this kind having a thickness of several 100 μm.

In some embodiments, as outer corona shielding and/or as internal potential control in the insulation system, there is a layer present of an insulant which is producible by curing by virtue of the insulation material with the curable matrix, the curing agent and the at least one filler fraction, this layer having a square resistance of 1 to 100 kohms at a layer thickness of around 100 to 400 μm.

In some embodiments, the insulation system comprises a main insulation, an internal potential control, IPC, an outer corona shielding, OCS, and an overhang corona shielding, OvCS, it being possible to set an electrical resistance in a range from $10^4$ ohms to $10^{12}$ by adjusting the filler fraction(s) in the polymeric matrix of the insulant. The resistance can be set through the choice of the metal oxide, the doping of the metal oxide, in terms both of the doping element and of the concentration, and also by the layer thickness of the insulant, and also by any combinations of the aforesaid possibilities for variation.

In some embodiments, the insulation system comprises the insulant and an insulating tape, in the form of a wrapping tape, for example.

In some embodiments, the at least one particle fraction of doped metal oxide has an aspect ratio of 10 or higher, and so is present in platelet form.

In some embodiments, the insulation material has a plurality of particle fractions, which are embedded in the curable matrix material.

In some embodiments, there are a plurality of particle fractions having different forms.

In some embodiments, there is at least one particle fraction present having platelet-shaped particles.

In some embodiments, there is at least one particle fraction present having globular particles.

In some embodiments, there is at least one particle fraction present having rodlet-shaped particles.

In some embodiments, at least one particle fraction is present in the form of short fibers.

In some embodiments, there are at least two particle fractions present, one with platelet-shaped particles and one with globular particles.

In some embodiments, there are at least two particle fractions of the same form present.

In some embodiments, there are at least two particle fractions present having different dimensions.

In some embodiments, there is at least one particle fraction present which has particles with at least one nanoscale dimension.

In some embodiments, there is at least one particle fraction present which has particles with at least one microscale dimension.

In some embodiments, the particles have n-doping.

In some embodiments, the particles are solid.

In some embodiments, the particles are porous.

In some embodiments, the particles are hollow.

In some embodiments, the platelet-shaped particles have one nanoscale and two microscale dimensions. "Nanoscale" in the present disclosure means that at least one particle fraction has a dimension in the nanometer range, for example below 500 nm, preferably below 300 nm and very preferably below 100 nm.

In some embodiments, the metal-oxidic material of which the particles of the at least one doped filler fraction are made is selected from the group of the following metal oxides, glasses and ceramics: metal oxides in binary and tertiary mixed phase, especially tin oxide, zinc oxide, zinc stannate, titanium oxide, lead oxide, silicon carbide, chromium oxide, aluminum oxide, any desired mixtures thereof, and/or further metal oxides or mixed metal oxides that are suitable for doping. The metal oxides stated above may be doped using, for example, the following elements, and also any desired mixtures of these elements: antimony, fluorine, chlorine, tungsten, molybdenum, iron, phosphorus, sulfur, nickel, alone or in any desired combinations. The concentration of the doping may be in the range from 5 to 30 mol %, more particularly from 10 to 20 mol %.

For use as a filler in the outer corona shielding it is possible as a result to realize, for example, small square resistances in the range from $10^3$ to $10^5$, more particularly in the region of $10^4$, ohms. Suitable material for the filler particles are all n-conducting semiconductors which can be produced as particles, can be embedded in the form of a composite insulant into a curable matrix, and can then be processed in thin layers. For example, the n-conducting filler particles may also be present in coated form. In some embodiments, under an oxidizing atmosphere, the filler particles are to form a notable superficial depletion boundary layer, and which by doping achieve a useful resistance range of an OCS, i.e., for example, in the range from $10^2$ to $10^7$ ohms.

In some embodiments, metal-oxidic filler particles, if appropriately produced and given n-conducting doping, are suitable as electron donors as a result of manifestation at depletion boundary layers with oxygen vacancies. In the case of partial discharges, these depletion boundary layers widen into lower layers and so give rise locally to a high-resistance region, in which the partial discharges are taken down simply by way of the potential. Accordingly, the electrical resistance of the percolated particle network increases with the oxygen vacancies in the insulant to such a degree that the properties of an overhang corona shielding are locally present and therefore the electrical field which can trigger a partial discharge is controlled resistively. Accordingly, defects present in the layer undergo self-passivation. Under the same loading, conventional OCS layers with carbon particles in insulants are completely destroyed.

Figure 2:
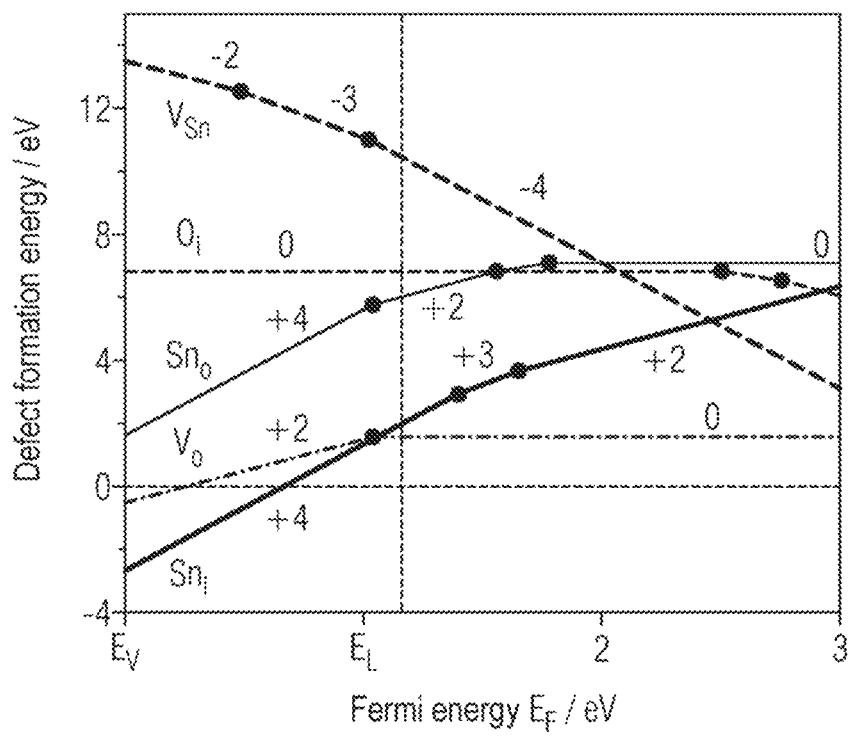
FIG. 2 shows the formation energies of defects in tin oxide particles.

Under an oxidizing atmosphere and at high temperature, the surface boundary layer of a metal oxide, as elucidated in FIGS. 1 and 2 with reference to tin oxide as an example, forms oxygen vacancies which act as electron donors and are here used with preference. In operation, therefore, an OCS produced therewith has—locally—a resistance structure which—comparable to the principle of the overhang corona shielding—effects resistive control of the electrical field, with the local field intensity and hence the local partial discharge activity decreasing over time for a voltage which remains the same.

Accordingly, an existing defect, through the n-conducting material that is present, automatically builds—so to speak—its own high-resistance layer providing resistive control, as a result of the self-oxidizing depletion boundary layers, and, consequently, the partial discharge activity in the defect subsides or disappears entirely. Hence a self-regulating layer is formed.

FIG. 1 in this regard shows a schematic of tin oxide particles having high-resistance depletion boundary layers. The figure shows a potential barrier 10 of the interface between two tin oxide particles 12 at which there is mutual repulsion by electrons 13 from the two tin oxide particle depletion boundary layers 11.

FIG. 2 shows the formation energies of defects in tin oxide particles. The formation energy of oxygen vacancies for tin oxide particles is located, as can be seen, in the region +/−0 eV and accordingly, in this material, oxygen vacancies can form under a reducing atmosphere and disappear again under an oxidizing atmosphere.

Figure 3:
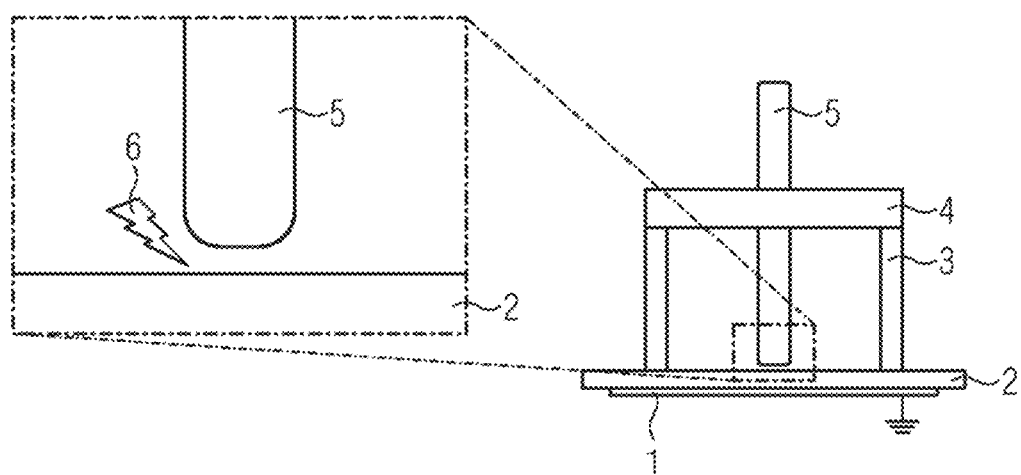
FIG. 3 shows a measuring system for testing use.

FIG. 3 shows a measuring system for testing use. The property tested was the electrical exposure under partial discharges of the kind occurring in the operation of an insulation system with main insulation, potential control internally, outer corona shielding and overhang corona shielding. The specimen tested comprised an insulant which can be used as outer corona shielding. The figure shows the plate electrode 1, on which the specimen 2 lies, followed by the rod electrode 5, of stainless steel, for example, and by a cover 4 and an annular support 3. The partial discharge is represented by the arrow 6.

Figure 4:
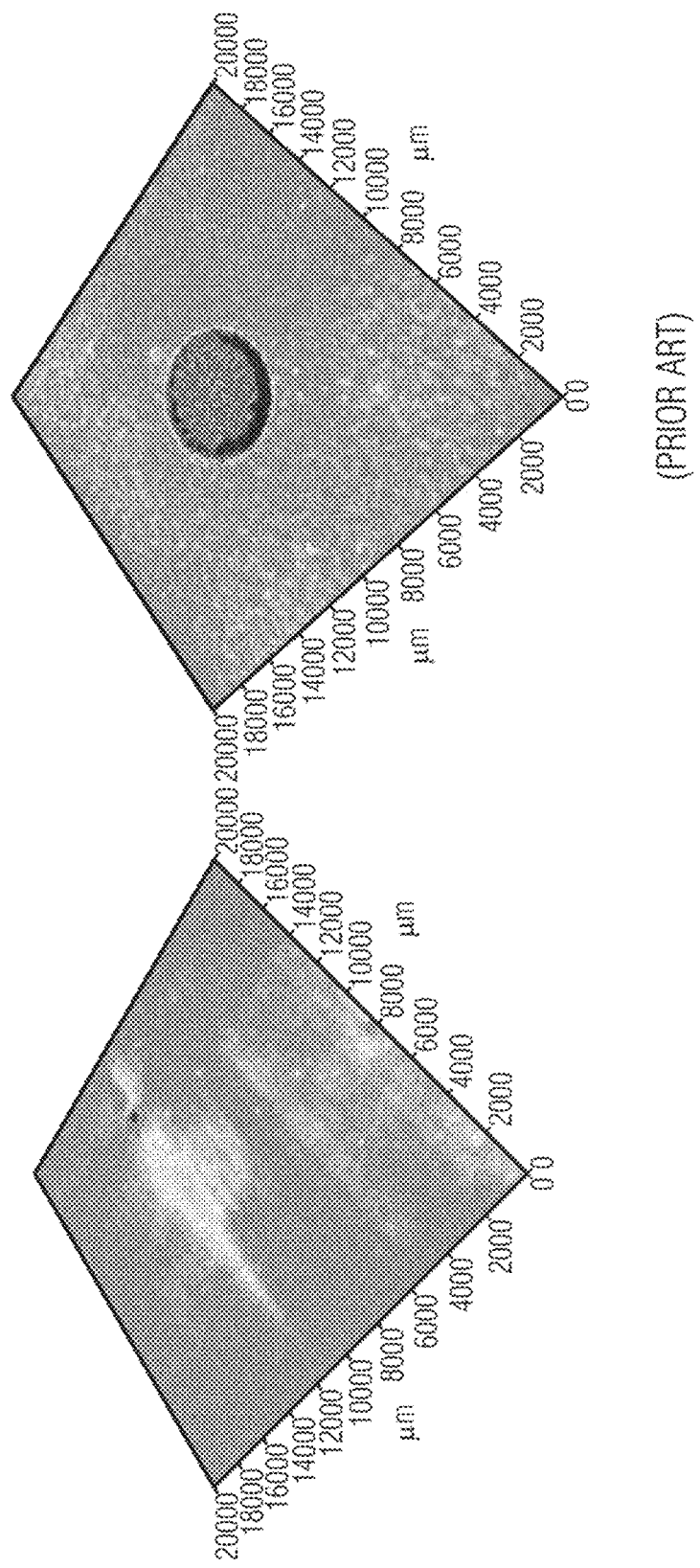
FIG. 4 shows two specimens from FIG. 3 in comparison.

FIG. 4 then shows two specimens 2 from FIG. 3 in comparison:
on the left, after testing, an insulant incorporating teachings of the present disclosure, a bedding matrix and therein at least one filler particle fraction which consists of a doped metal oxide, virtually undamaged, and
on the right, a comparative specimen with conventional carbon black/graphite-filled insulant, which has suffered complete destruction locally.

It can be seen that in the tests in which partial discharges were triggered with a bar electrode on test coatings over a number of hours, an insulant whose electrical conductivity is generated by the doped metal oxide particles of the invention exhibits a significantly higher resistance toward partial discharges. Hence under the same particle discharge exposure conditions, at the time at which the carbon black/graphite-filled conventional insulants already have a complete hole, having thus been locally "eaten up" entirely, the specimen composed of the insulant incorporating teachings of the present disclosure shows virtually no traces of erosion.

In the case of a destroyed site in the insulation system of a generator, as shown on the right in FIG. 4, therefore, a conventional outer corona shield would undergo successive dissolution, and the defect would grow with increasing rapidity, accompanied by stress to and destruction of the main insulation as a result of increasing field intensities and hence partial discharge activities. The left-hand specimen with the comparative layer incorporating teachings of the present disclosure, in the example an insulant filled with doped tin oxide, on the other hand, exhibits not only the erosion resistance but also a significantly increased resistance profile, as can be seen in FIG. 5.

Figure 5:
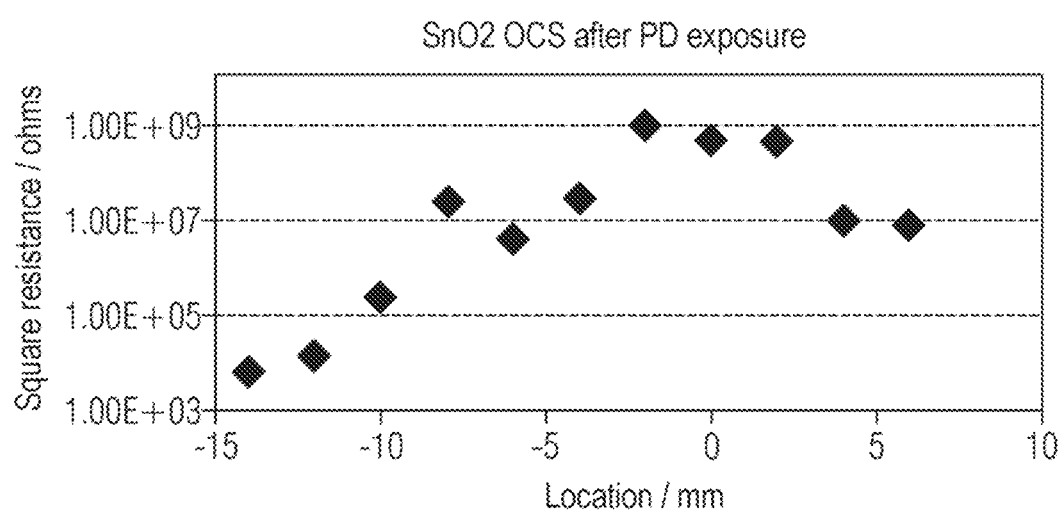
FIG. 5 shows the measurement of the resistance over that region of the left-hand specimen from FIG. 4 that is stressed by partial discharges.

FIG. 5 shows the measurement of the resistance over that region of the left-hand specimen from FIG. 4 that is stressed by partial discharges, and, as expected, a shift in resistance was observed from the "normal" OCS resistance range, of around $10^4$ ohms, to the resistance range of the OvCS, of around $10^9$ ohms. This effect is attributable to the surface boundary layers—in this regard, compare FIG. 1—and to their oxidation through the local energy of the partial discharges and the presence of an oxidizing atmosphere, as shown in FIG. 2. The result in the case of the left-hand specimen, locally, is an OvCS resistance structure whereby the electrical field is resistively controlled and hence the local field intensity and, accordingly, the local partial discharge activity go down over time for the same voltage.

Accordingly, an existing defect, through the n-conducting material that is present, automatically "builds"—so to speak—its own high-resistance layer providing resistive control, as a result of the self-oxidizing depletion boundary layers, and, consequently, the partial discharge activity in the defect subsides or disappears entirely. Hence a self-regulating insulant for an outer corona shield is formed. FIG. 5 shows the measured shift in resistance over the partial discharge-stressed site of the outer corona shielding test layer incorporating teachings of the present disclosure, with doped tin oxide particles as a filler fraction in the insulant.

Here, for the first time, an insulation material for an insulation system is presented in which filler particles embedded in a polymeric matrix are used for the OCS which in principle are n-doped metal oxides which on the one hand in the composite material, above the percolation threshold, have a square resistance of 1 to 1000 kohms and on the other hand at the same time, as a result of local electrical discharges at the defects, cause a local rise in the OCS resistance under an oxygen-containing atmosphere by up to 7 decades, so that the locally increased resistance region functions like a locally resistive-capacitive field control—comparable with an overhang corona shield OvCS. As a result of the stress which occurs as a result of partial discharges, the electrochemical properties of the particles are altered such that they automatically develop into an OCS layer. In the present context, therefore, it is possible to refer to a system as "self-healing" or self-"passivating", and this significantly lengthens the lifetime of the insulation systems of electrically rotating machines.

What is claimed is:

1. An insulation material for an electrical rotating machine, the material comprising:
   a curable matrix material;
   a curing agent operable to set the curable matrix material; and
   a filler embedded in the matrix material;
   wherein the filler comprises electrically conductive n-doped metal oxide particles including at least one metal oxide in binary and tertiary mixed phase; and
   wherein the particles are doped with at least two elements selected from the group consisting of: fluorine, chlorine, phosphorus, and sulfur.

2. The insulation material as claimed in claim 1, wherein a concentration of the particles in the filler exceeds a respective percolation threshold.

3. The insulation material as claimed in claim 1, wherein the particles have an aspect ratio of 10 or higher.

4. The insulation material as claimed in claim 1, further comprising a second filler comprising electrically conductive doped metal oxide particles embedded in the curable matrix material.

5. The insulation material as claimed in claim 1, further comprising a second filler comprising electrically conductive doped metal oxide particles embedded in the curable matrix material;
   wherein the particles of the second filler have a different form in comparison to particles of the first filler.

6. The insulation material as claimed in claim 1, wherein the particles comprise spheres.

7. The insulation material as claimed in claim 1, further comprising a second filler comprising electrically conductive doped metal oxide particles embedded in the curable matrix material;
   wherein the particles of the second filler have different dimensions in comparison to particles of the first filler.

8. The insulation material as claimed in claim 1, wherein the particles have a nanoscale dimension.

9. The insulation material as claimed in claim 1, wherein the particles have a microscale dimension.

10. The insulation material as claimed in claim 1, wherein the particles comprise solid material.

11. An insulation system comprising:
    a main insulation;
    an outer corona shielding; and
    an overhang corona shielding;
    wherein the outer corona shielding includes an insulation material for an electrical rotating machine, the insulation material comprising:
    a cured matrix material; and
    a filler embedded in the matrix material;
    wherein the filler comprises electrically conductive n-doped metal oxide particles including at least one metal oxide in binary and tertiary mixed phase;
    wherein the particles are doped with at least two elements selected from the group consisting of: fluorine, chlorine, phosphorus, and sulfur.

* * * * *